(12) United States Patent
Hayashi et al.

(10) Patent No.: US 11,459,077 B2
(45) Date of Patent: Oct. 4, 2022

(54) MARINE POWER SUPPLY SYSTEM AND METHOD FOR POWER CONTROL IN MARINE PROPULSION SYSTEM

(71) Applicant: YAMAHA HATSUDOKI KABUSHIKI KAISHA, Iwata (JP)

(72) Inventors: Takuya Hayashi, Shizuoka (JP); Yoshihiro Mizushima, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 71 days.

(21) Appl. No.: 17/224,163

(22) Filed: Apr. 7, 2021

(65) Prior Publication Data
US 2021/0323649 A1    Oct. 21, 2021

(30) Foreign Application Priority Data
Apr. 15, 2020 (JP) .............................. JP2020-072741

(51) Int. Cl.
| | |
|---|---|
| *B63H 21/21* | (2006.01) |
| *B60L 50/60* | (2019.01) |
| *B60L 58/12* | (2019.01) |
| *B63H 21/14* | (2006.01) |
| *B63H 21/17* | (2006.01) |
| *B63H 23/30* | (2006.01) |
| *F02N 11/08* | (2006.01) |

(52) U.S. Cl.
CPC ............. *B63H 21/21* (2013.01); *B60L 50/60* (2019.02); *B60L 58/12* (2019.02); *B63H 21/14* (2013.01); *B63H 21/17* (2013.01); *B63H 23/30* (2013.01); *F02N 11/0862* (2013.01); *B60L 2200/32* (2013.01)

(58) Field of Classification Search
CPC ........ B63H 21/21; B63H 21/14; B63H 21/17; B63H 23/30; B60L 50/60; B60L 58/12; B60L 2200/32; F02N 11/0862
See application file for complete search history.

(56) References Cited

U.S. PATENT DOCUMENTS

| | | | |
|---|---|---|---|
| 8,118,627 B2 | 2/2012 | Wejrzanowski et al. | |
| 2010/0144219 A1* | 6/2010 | Balogh | .................. B63H 21/20 192/30 R |
| 2011/0244739 A1* | 10/2011 | Daikoku | ................ B63H 21/17 440/6 |

(Continued)

FOREIGN PATENT DOCUMENTS

| | | |
|---|---|---|
| JP | 2012-254691 A | 12/2012 |
| JP | 2017-218016 A | 12/2017 |

OTHER PUBLICATIONS

Official Communication issued in corresponding European Patent Application No. 21167624.2, dated Sep. 21, 2021.

*Primary Examiner* — Stephen P Avila
(74) *Attorney, Agent, or Firm* — Keating and Bennett, LLP

(57) ABSTRACT

A marine power supply system includes a battery unit including a first battery to supply power to a starter that starts an engine, and a second battery to supply power to an electric motor, and a power distributor connected to the first battery and the second battery. The power distributor outputs a demand power amount of power required by the first battery to the first battery, and outputs at least a portion of surplus power to the second battery when a total demand power amount required by the battery unit includes the surplus power.

20 Claims, 7 Drawing Sheets

(56) References Cited

U.S. PATENT DOCUMENTS

2017/0349256 A1   12/2017  Nakamura
2019/0248461 A1   8/2019   Maejima
2020/0062362 A1   2/2020   Nakamura et al.

* cited by examiner

MARINE POWER SUPPLY SYSTEM AND METHOD FOR POWER CONTROL IN MARINE PROPULSION SYSTEM

CROSS REFERENCE TO RELATED APPLICATIONS

This application claims the benefit of priority to Japanese Patent Application No. 2020-072741 filed on Apr. 15, 2020. The entire contents of this application are hereby incorporated herein by reference.

BACKGROUND OF THE INVENTION

1. Field of the Invention

The present invention relates to a marine power supply system and a method for power control in a marine propulsion system.

2. Description of the Related Art

A marine power supply system that supplies power to a marine propulsion unit including an engine and an electric motor and a method for power control in a marine propulsion system are known in general. Such a marine power supply system is disclosed in Japanese Patent Laid-Open No. 2017-218016, for example.

Japanese Patent Laid-Open No. 2017-218016 discloses a marine vessel including a marine propulsion device including an engine and an electric motor. The marine propulsion device includes a propeller. Both the engine and the electric motor generate power to rotate the propeller. The marine vessel includes a starter motor, a first battery that supplies power to the starter motor, and a second battery that supplies power to the electric motor. The starter motor starts the engine using the power from the first battery. The electric motor rotates the propeller using the power from the second battery.

Although not described in Japanese Patent Laid-Open No. 2017-218016, in the marine vessel (marine power supply system) that supplies power to the marine propulsion device, it is necessary to supply power to the first battery and the second battery in order to charge the first battery and the second battery. However, when the amount of power supplied to the first battery is relatively small, and the amount of charge of the first battery decreases, it may be difficult for the starter motor to start the engine. Therefore, conventionally, a marine power supply system and a method for power control in a marine propulsion system that significantly reduce or prevent as much as possible a decrease in the amount of power supplied to a first battery that supplies power to a starter motor (starter) that starts an engine even when power is supplied to a marine propulsion device (marine propulsion unit) including an electric motor are desired.

SUMMARY OF THE INVENTION

Preferred embodiments of the present invention provide marine power supply systems and methods for power control in marine propulsion systems that each significantly reduce or prevent as much as possible a decrease in the amount of power supplied to first batteries that supply power to starters that start engines even when power is supplied to marine propulsion units including electric motors.

A marine power supply system according to a preferred embodiment of the present invention supplies power to a marine propulsion unit including a propulsion generator, an engine that drives the propulsion generator, and an electric motor that drives the propulsion generator, and includes a battery unit including a first battery to supply power to a starter that starts the engine, and a second battery to supply power to the electric motor, and a power distributor connected to the first battery and the second battery. The power distributor outputs a demand power amount of power required by the first battery to the first battery, and outputs at least a portion of surplus power to the second battery when a total demand power amount required by the battery unit includes the surplus power.

In a marine power supply system according to a preferred embodiment of the present invention, the power distributor outputs, to the first battery that supplies power to the starter that starts the engine, the demand power amount of the power required by the first battery, and outputs at least a portion of the surplus power to the second battery that supplies power to the electric motor when the total demand power amount required by the battery unit includes the surplus power. Accordingly, even when the second battery is provided in the marine power supply system, the power distributor supplies power to the first battery in preference to the second battery. Furthermore, the surplus power is supplied to the second battery having a relatively low priority while the demand power amount of the power required by the first battery is supplied to the first battery. Consequently, even when power is supplied to the marine propulsion unit including the electric motor, a decrease in the amount of power supplied to the first battery is significantly reduced or prevented as much as possible.

In a marine power supply system according to a preferred embodiment of the present invention, the power distributor preferably outputs, to the second battery, at least a portion of the surplus power obtained by subtracting at least the demand power amount required by the first battery from the total demand power amount. Accordingly, at least a portion of the surplus power is supplied to the second battery while the demand power amount required by the first battery is provided within the total demand power amount.

In a marine power supply system according to a preferred embodiment of the present invention, the battery unit preferably further includes a third battery to supply power to at least one of a plurality of devices in a marine vessel excluding the electric motor and the starter that starts the engine, and the power distributor preferably outputs the demand power amount of the power required by the first battery to the first battery, and outputs at least a portion of the surplus power to the third battery when the total demand power amount includes the surplus power. Accordingly, even when the third battery is provided in the marine power supply system, at least a portion of the surplus power is supplied to the third battery. Consequently, even when the third battery in addition to the first battery and the second battery is provided in the marine power supply system, power is supplied to the first battery in preference to the third battery, and thus a decrease in the amount of power supplied to the first battery is significantly reduced or prevented as much as possible.

In such a case, the power distributor preferably outputs to the second battery a power amount of power obtained by subtracting a demand power amount required by the third battery from the surplus power. Accordingly, at least a portion of the surplus power is supplied to the second battery while the demand power amount required by the third battery is provided within the surplus power. Consequently, the surplus power equal to the demand power amount required by the third battery is supplied to the third battery in preference to the second battery.

In a marine power supply system according to a preferred embodiment of the present invention, the battery unit preferably further includes a third battery to supply power to at least one of a plurality of devices in a marine vessel excluding the electric motor and the starter that starts the engine, and the power distributor preferably performs a control to limit power supply to the third battery or to stop the power supply to the third battery when the surplus power is less than a surplus power threshold. Accordingly, when the surplus power is relatively small, the proportion of the amount of power supplied to the third battery relative to the total demand power amount is reduced.

A marine power supply system according to a preferred embodiment of the present invention preferably further includes an electric motor controller configured or programmed to limit driving of the electric motor based on a charge amount of the second battery. Accordingly, when the charge amount of the second battery is not sufficient, driving of the electric motor is limited such that the power consumption of the second battery is reduced. Therefore, a decrease in the charge amount of the second battery is significantly reduced or prevented, and thus the proportion of the demand power amount required by the second battery in the total demand power amount is reduced. In addition, a decrease in the proportion of the amount of power supplied to the first battery in the total demand power amount is further significantly reduced or prevented.

In such a case, the battery unit preferably further includes a third battery to supply power to at least one of a plurality of devices in a marine vessel excluding the electric motor and the starter that starts the engine, and the power distributor preferably performs a control to limit power supply to the third battery or to stop the power supply to the third battery when the charge amount of the second battery is equal to or less than a charge amount threshold. When the charge amount of the second battery is relatively small (when it is smaller than the charge amount threshold), it may be difficult to continuously drive the electric motor using power from the second battery. In this regard, according to a preferred embodiment of the present invention, the power distributor performs a control to limit the power supply to the third battery or to stop the power supply to the third battery when the charge amount of the second battery is equal to or less than the charge amount threshold. Accordingly, when the charge amount of the second battery is equal to or less than the charge amount threshold, the amount of power supplied to the third battery is limited or reduced to zero such that the proportion of the amount of power supplied to the second battery in the surplus power is increased.

In a marine power supply system that performs a control to limit or stop the power supply to the third battery when the charge amount of the second battery is equal to or less than the charge amount threshold, the marine propulsion unit preferably includes a clutch provided between the engine and the propulsion generator to switch between a state in which a rotational force is transmitted from the engine to the propulsion generator and a state in which a rotational force is not transmitted from the engine to the propulsion generator, and the electric motor controller is preferably configured or programmed to control the electric motor to assist driving of the clutch when the clutch performs a switching operation even when the charge amount of the second battery is equal to or less than the charge amount threshold. Accordingly, driving of the clutch is assisted by the electric motor such that noise generated when the clutch is switched is reduced. According to a preferred embodiment of the present invention, with the structure described above, even when the charge amount of the second battery is equal to or less than the charge amount threshold, the electric motor continuously assists driving of the clutch. Consequently, even when the charge amount of the second battery is equal to or less than the charge amount threshold, noise generated when the clutch is switched is reduced.

A marine power supply system including the electric motor controller preferably further includes a charge amount acquirer to acquire the charge amount of the second battery based on a current value of a current that flows from the power distributor to the second battery and a current value of a current that flows from the second battery to the electric motor controller. Accordingly, the current value of the current that flows from the power distributor to the second battery and the current value of the current that flows from the second battery to the electric motor controller are detected such that the charge amount of the second battery is easily acquired by the charge amount acquirer (electric motor controller).

In a marine power supply system according to a preferred embodiment of the present invention, the power distributor preferably includes a current value detector to detect a current value of a current that flows between the power distributor and the first battery, and acquires the demand power amount required by the first battery based on the current value. Accordingly, the current value detector is provided such that the demand power amount required by the first battery is easily acquired by the power distributor.

In such a case, the power distributor preferably acquires, as the demand power amount required by the first battery, an amount obtained by subtracting an amount of power in the first battery being consumed based on a current value of a current that flows from the first battery to the power distributor from an amount of power being stored in the first battery based on a current value of a current that flows from the power distributor to the first battery. Accordingly, the current value of the current that flows from the first battery to the power distributor and the current value of the current that flows from the power distributor to the first battery are detected such that the demand power amount required by the first battery is easily acquired by the power distributor.

In a marine power supply system according to a preferred embodiment of the present invention, the power distributor preferably includes a converter to boost a voltage of at least a portion of the surplus power and output boosted power to the second battery. Accordingly, even when the voltage value of power input to the power distributor (the voltage value of the surplus power) is smaller than a voltage value input to the second battery, the power voltage of at least a portion of the surplus power is boosted, and thus power is easily supplied to the second battery. The converter adjusts the magnitude of the power when the voltage is boosted, and thus a power amount to be output to the first battery and a power amount to be output to the second battery are easily distributed using the converter.

In a marine power supply system according to a preferred embodiment of the present invention, the power distributor preferably inputs power from the second battery to the power distributor when there is not the surplus power. Accordingly, even when there is no surplus power amount, power is supplied from the second battery to the first battery. Consequently, a decrease in the amount of power supplied to the first battery is further significantly reduced or prevented.

A marine power supply system according to a preferred embodiment of the present invention preferably further includes a generator to generate power and input generated power to the power distributor. Accordingly, power to be supplied to the power distributor is generated by the generator.

In a marine power supply system according to a preferred embodiment of the present invention, the power distributor preferably outputs the demand power amount of the power required by the first battery to the first battery, and outputs at least a portion of the surplus power to the second battery when the total demand power amount obtained by subtracting an output power amount output from the battery unit from an input power amount input to the battery unit includes the surplus power. Accordingly, the total demand power amount is easily acquired, and power is supplied to the first battery in preference to the second battery based on the acquired total demand power amount.

A marine power supply system according to a preferred embodiment of the present invention supplies power to a marine propulsion unit including a propulsion generator, an engine that drives the propulsion generator, and an electric motor that drives the propulsion generator, and includes a battery unit including a first battery to supply power to a starter that starts the engine, and a second battery to supply power to the electric motor, and a power distributor connected to the first battery and the second battery. The power distributor outputs power to the first battery in preference to the second battery.

In a marine power supply system according to a preferred embodiment of the present invention, the power distributor outputs power to the first battery in preference to the second battery. Accordingly, even when power is supplied to the marine propulsion unit including the electric motor, a decrease in the amount of power supplied to the first battery is significantly reduced or prevented as much as possible, similarly to the marine power supply system described above.

A method for power control in a marine propulsion system including a propulsion generator, an engine that drives the propulsion generator, and an electric motor that drives the propulsion generator according to a preferred embodiment of the present invention includes outputting, to a first battery that supplies power to a starter that starts the engine, a demand power amount of power required by the first battery, and outputting at least a portion of surplus power to a second battery that supplies power to the electric motor when a total demand power amount required by a battery unit including the first battery and the second battery includes the surplus power.

In a method for power control in a marine propulsion system according to a preferred embodiment of the present invention, similarly to the marine power supply systems according to preferred embodiments of the present invention described above, even when power is supplied to the marine propulsion unit including the electric motor, a decrease in the amount of power supplied to the first battery is significantly reduced or prevented as much as possible.

In a method for power control in a marine propulsion system according to a preferred embodiment of the present invention, the outputting of at least the portion of the surplus power to the second battery preferably includes outputting to the second battery at least a portion of the surplus power obtained by subtracting at least the demand power amount required by the first battery from the total demand power amount. Accordingly, at least a portion of the surplus power is supplied to the second battery while the demand power amount required by the first battery is provided within the total demand power amount.

In a method for power control in a marine propulsion system according to a preferred embodiment of the present invention, the battery unit preferably further includes a third battery to supply power to at least one of a plurality of devices in a marine vessel excluding the electric motor and the starter that starts the engine, and the method for power control preferably further includes outputting at least a portion of the surplus power to the third battery when the total demand power amount includes the surplus power. Accordingly, even when in addition to the first battery and the second battery, the third battery is provided in the battery unit, at least a portion of the surplus power is supplied to the third battery. Consequently, even when the third battery is provided in the battery unit, power is supplied to the first battery in preference to the third battery, and thus a decrease in the amount of power supplied to the first battery is significantly reduced or prevented as much as possible.

In such a case, the outputting of at least the portion of the surplus power to the second battery preferably includes outputting to the second battery a power amount of power obtained by subtracting a demand power amount required by the third battery from the surplus power. Accordingly, at least a portion of the surplus power is supplied to the second battery while the demand power amount required by the third battery is provided within the surplus power. Consequently, the surplus power equal to the demand power amount required by the third battery is supplied to the third battery in preference to the second battery.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a marine vessel 100 according to a first preferred embodiment of the present invention is now described with reference to FIGS. 1 to 3. In the figures, arrow FWD represents the forward movement direction of the marine vessel 100, and arrow BWD represents the reverse movement direction of the marine vessel 100.

Figure 1:
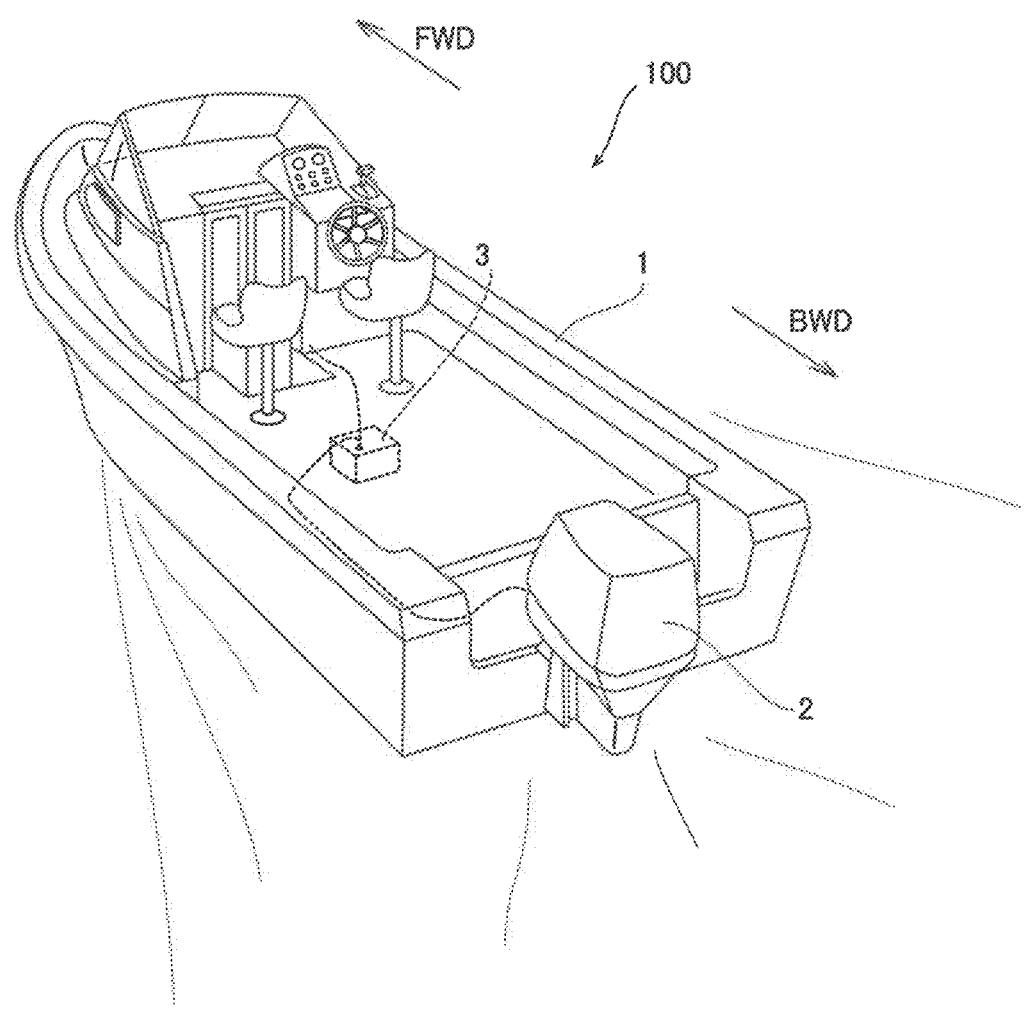
FIG. 1 is a perspective view schematically showing a marine vessel including a marine vessel control system according to a first preferred embodiment of the present invention.
Figure 2:
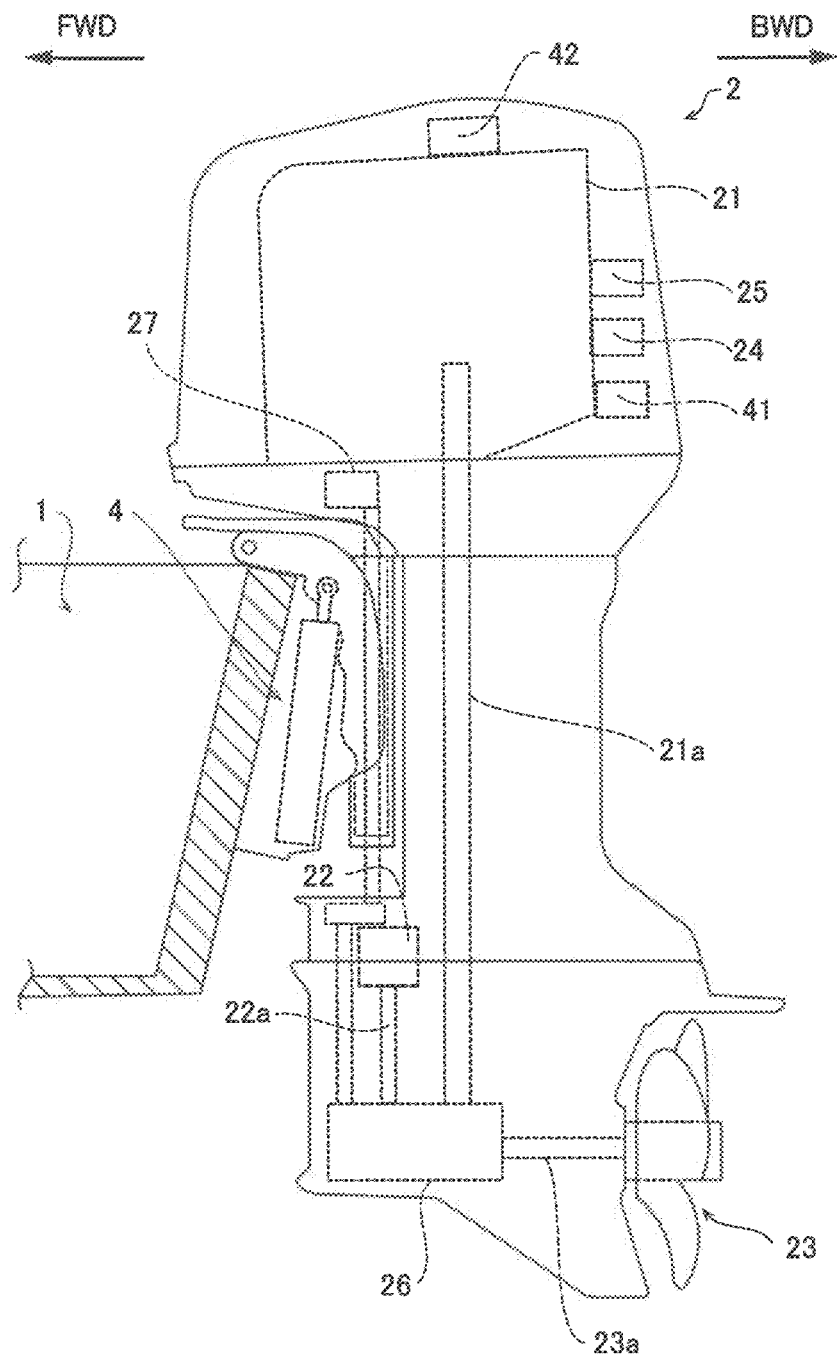
FIG. 2 is a side view illustrating the structure of an outboard motor according to the first preferred embodiment of the present invention.

As shown in FIG. 1, the marine vessel 100 includes a hull 1, an outboard motor 2, a marine vessel control system 3, and a steering 4 (see FIG. 2). That is, the marine vessel 100 is an outboard motor boat. Furthermore, the marine vessel control system 3 is a power supply system that supplies power to the outboard motor 2. The outboard motor 2 is an example of a "marine propulsion unit". The marine vessel control system 3 is an example of a "marine power supply system".

As shown in FIG. 2, the outboard motor 2 is attached to the hull 1 via the steering 4. The outboard motor 2 includes an engine 21, an electric motor 22, a propeller 23, an engine ECU (electronic control unit) 24, a starter motor 25, a clutch 26, and a shift actuator 27. The propeller 23 is an example of a "propulsion generator". The starter motor 25 is an example of a "starter".

The engine 21 drives the propeller 23. Specifically, the engine 21 is an internal combustion engine driven by combustion of gasoline, light oil, or the like. The engine 21 is connected to the propeller 23 via a drive shaft 21a, the clutch 26, and a propeller shaft 23a. A driving force (rotational force) is transmitted from the engine 21 to the propeller 23 such that the propeller 23 rotates, and the marine vessel 100 (hull 1) is propelled.

The electric motor 22 drives the propeller 23. The electric motor 22 is a motor. The electric motor 22 is driven using power converted by an inverter device 41. The electric motor 22 is connected to the propeller 23 via a shaft 22a, the clutch 26, and the propeller shaft 23a. A driving force (rotational force) is transmitted from the electric motor 22 to the propeller 23 such that the propeller 23 rotates, and the marine vessel 100 (hull 1) is propelled. The electric motor 22 drives and assists the clutch 26 (propeller shaft 23a) when the clutch 26 performs a switching operation described below.

The propeller 23 is positioned in the water, and rotates to generate a propulsive force.

Figure 3:
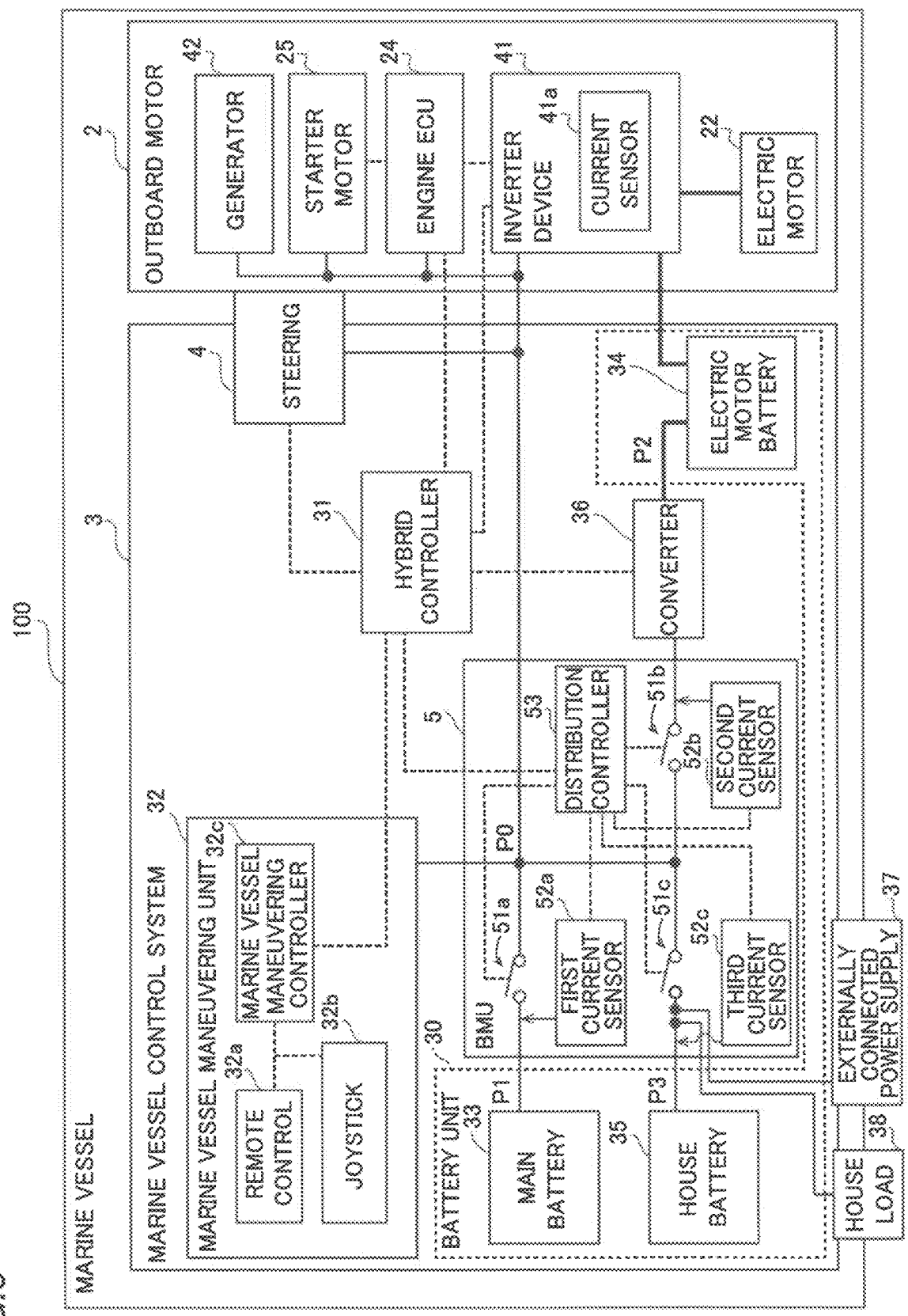
FIG. 3 is a block diagram showing the structure of the marine vessel according to the first preferred embodiment of the present invention.

As shown in FIG. 3, the engine ECU 24 communicates with a hybrid controller 31 described below and the inverter device 41. For example, the engine ECU 24 transmits and receives information and command signals to and from the hybrid controller 31 and the inverter device 41 by controller area network (CAN) communication. The engine ECU 24 is connected to a main battery 33 via a battery management unit 5 (hereinafter referred to as a "BMU 5"). The engine ECU 24 operates using power from the main battery 33. In FIG. 3, dotted lines are shown as communication lines, and solid lines are shown as power lines. The communication lines may represent wired communication or wireless communication.

The starter motor 25 starts the engine 21. Specifically, the starter motor 25 is connected to the main battery 33 via the BMU 5. The starter motor 25 is driven using power from the main battery 33. The starter motor 25 rotates (cranks) a crankshaft of the engine 21 based on a command from the engine ECU 24 (hybrid controller 31). The engine 21 is cranked by the starter motor 25, fuel is supplied into the engine 21 by a fuel supplier (not shown), and the fuel in the engine 21 is ignited by an igniter (not shown) to start the engine 21. Power is supplied from the main battery 33 to the fuel supplier and the igniter.

As shown in FIG. 2, the clutch 26 is provided between the engine 21 and the propeller 23, and switches between a state in which a rotational force is transmitted from the engine 21 to the propeller 23 (a state in which "the shift position is at a forward movement position" or a state in which "the shift position is at a reverse movement position") and a state in which a rotational force is not transmitted from the engine 21 to the propeller 23 (a state in which "the shift position is at a neutral position") (performs the switching operation). The clutch 26 is a dog clutch, for example. The clutch 26 may be a friction clutch. The electric motor 22 rotates a gear in the clutch 26 or the propeller 23 such that the rotation of the gear in the clutch 26 or the propeller 23 is synchronized with rotation of the drive shaft connected to the engine 21 before the clutch 26 performs the switching operation. The rotation speed of the gear in the clutch 26 and the rotation speed of the drive shaft are close to each other, and thus the impact in the clutch 26 during the switching operation of the clutch 26 is reduced.

The shift actuator 27 moves the shift position between the forward movement position and the neutral position and moves the shift position between the reverse movement position and the neutral position based on commands from the hybrid controller 31.

As shown in FIG. 3, the marine vessel control system 3 includes a battery unit 30, the hybrid controller 31, a marine vessel maneuvering unit 32, a converter 36, an externally connected power supply 37, a house load 38, the inverter device 41, a generator 42, and the BMU 5. The battery unit 30 includes the main battery 33, an electric motor battery 34, and a house battery 35. The hybrid controller 31, the converter 36, and the BMU 5 are examples of a "power distributor". The main battery 33 is an example of a "first battery". The electric motor battery 34 is an example of a "second battery". The house battery 35 is an example of a "third battery". The hybrid controller 31 is an example of a "charge amount acquirer". The inverter device 41 is an example of an "electric motor controller".

The hybrid controller 31, the marine vessel maneuvering unit 32, the main battery 33, the electric motor battery 34, the house battery 35, the converter 36, the externally connected power supply 37, and the BMU 5 are provided in the hull 1, for example. The inverter device 41 and the generator 42 are provided in the outboard motor 2.

The hybrid controller 31 is a control circuit that controls both driving of the engine 21 in the outboard motor 2 and driving of the electric motor 22 in the outboard motor 2. For example, the hybrid controller 31 includes a processor such as a CPU to perform an arithmetic process.

In the first preferred embodiment, the hybrid controller 31 is configured or programmed to acquire the charge amount C of the electric motor battery 34. Specifically, the hybrid controller 31 is configured or programmed to acquire the charge amount C of the electric motor battery 34 based on a current value I2a of a current that flows from the electric motor battery 34 to the inverter device 41 and a current value I2b of a current that flows from the BMU 5 to the electric motor battery 34. More specifically, the hybrid controller 31 is configured or programmed to calculate the charge amount C of the electric motor battery 34 based on the current value I2a acquired by a current sensor 41a provided in the inverter device 41 described below and the current value I2b acquired by a second current sensor 52b of the BMU 5 described below. That is, the hybrid controller 31 calculates the charge amount C of the electric motor battery 34 based on the amount of power stored in the electric motor battery 34 and the power consumption of the electric motor battery 34.

In the first preferred embodiment, the hybrid controller 31 is configured or programmed to acquire a demand power amount D1 required by the main battery 33 based on current values I1a and I1b. That is, the hybrid controller 31 acquires an amount obtained by subtracting the amount of power in the main battery 33 being consumed based on the current value I1a from the amount of power being stored in the main battery 33 based on the current value I1b as the demand power amount D1. That is, when the voltage value of the main battery 33 is V1, the hybrid controller 31 acquires the demand power amount D1 based on the following formula (1). The marine vessel control system 3 may include a voltage value detector, and the voltage value detector may detect the voltage value V1 and voltage values V2 and V3 described below. Alternatively, the marine vessel control system 3 may not include a voltage value detector, and the hybrid controller 31 may acquire preset values (rated values) as the voltage values V1, V2, and V3.

$$D1 = (I1b - I1a) \times V1 \quad (1)$$

The hybrid controller 31 acquires a demand power amount D2 required by the electric motor battery 34 based on the current values I2a and I2b, and acquires a demand power amount D3 required by the house battery 35 based on current values I3a and I3b. That is, when a value of a voltage applied to the input side of the converter 36 is V2, and the voltage value of the house battery 35 is V3, the hybrid controller 31 acquires the demand power amounts D2 and D3 based on the following formulae (2) and (3), respectively.

$$D2 = (I2b - I2a) \times V2 \quad (2)$$

$$D3 = (I3b - I3a) \times V3 \quad (3)$$

The demand power amount D3 is an example of a "surplus power threshold".

The hybrid controller 31 acquires a total demand power amount D0 required by the battery unit 30. The total demand power amount D0 is the total amount of the demand power amounts D1, D2, and D3. Furthermore, the hybrid controller 31 acquires a surplus power amount (surplus power) Ps obtained by subtracting the demand power amount D1 from the total demand power amount D0. For example, when the voltage value of the main battery 33 is V1, the voltage value applied to the converter 36 is V2, and the voltage value of the house battery 35 is V3, the total demand power amount D0 is acquired based on the following formula (4). That is, the total demand power amount D0 is the amount of power obtained by subtracting an output power amount from the battery unit 30 from an input power amount to the battery unit 30.

$$D0 = D1 + D2 + D3 = \quad (4)$$
$$(I1b - I1a) \times V1 + (I2b - I2a) \times V2 + (I3b - I3a) \times V3$$

The marine vessel maneuvering unit 32 includes a remote control 32a, a joystick 32b, and a marine vessel maneuvering controller 32c. The remote control 32a and the joystick 32b receive input operations by an operator and transmit operation signals based on the received input operations to the marine vessel maneuvering controller 32c. The marine vessel maneuvering controller 32c includes a remote control ECU, and is configured or programmed to transmit the operation signals to the engine ECU 24 and the steering 4 via the hybrid controller 31.

The main battery 33 supplies power to the starter motor 25 that starts the engine 21 via the BMU 5. The electric motor battery 34 supplies power to the electric motor 22 via the inverter device 41. The house battery 35 supplies power to the house load 38, which is at least one of a plurality of devices in the marine vessel 100 excluding the electric motor 22 and the starter motor 25. The main battery 33, the electric motor battery 34, and the house battery 35 are lead storage batteries or lithium-ion batteries, for example. For example, all of the main battery 33, the electric motor battery 34, and the house battery 35 may be lead storage batteries.

The converter 36 boosts the power voltage of at least a portion of the surplus power amount Ps described below and outputs the boosted power to the electric motor battery 34. For example, the converter 36 boosts a voltage of 12V to a voltage of 36V or 48V.

The externally connected power supply 37 is connectable to an external power supply (commercial power supply) of the marine vessel 100. The externally connected power supply 37 is connected to the BMU 5, and inputs power supplied from the external power supply of the marine vessel 100 to the BMU 5. For example, the externally connected power supply 37 converts AC power into DC power, and inputs the DC power to the BMU 5.

The house load 38 is preferably at least one device that operates using power from the house battery 35. The house load 38 is at least one of a plurality of devices in the marine vessel 100 excluding the electric motor 22 and the starter motor 25. For example, the house load 38 may be an in-cabin lighting and a fish finder.

The inverter device 41 converts DC power from the electric motor battery 34 into AC power and supplies the AC power to the electric motor 22 based on a command from at least one of the hybrid controller 31 or the engine ECU 24. The inverter device 41 includes the current sensor 41a that detects the current value I2a of the current that flows from the electric motor battery 34 to the inverter device 41.

The engine 21 is driven such that the generator 42 generates power and inputs the generated power to the BMU 5.

The BMU 5 distributes the total demand power amount D0 to the main battery 33 and the electric motor battery 34 when the total demand power amount D0 includes the surplus power amount Ps. Specifically, in the first preferred embodiment, the BMU 5 outputs the demand power amount D1 of power (first output power P1) required by the main battery 33 to the main battery 33, and outputs at least a portion (second output power P2) of the surplus power amount Ps to the motor battery 34 when the total demand power amount D0 includes the surplus power amount Ps.

The BMU 5 is connected to the externally connected power supply 37 and the generator 42. An input power amount Pi of power is input from at least one of the externally connected power supply 37 or the generator 42 to the BMU 5.

The BMU 5 is connected to the main battery 33, the electric motor battery 34, the house battery 35, and the inverter device 41. The BMU 5 includes a first switch 51a, a second switch 51b, a third switch 51c, a first current sensor 52a, a second current sensor 52b, a third current sensor 52c, and a distribution controller 53. The BMU 5 is connected to the main battery 33 via the first switch 51a. The BMU 5 is connected to the electric motor battery 34 via the second switch 51b. The BMU 5 is connected to the house battery 35 via the third switch 51c. The first current sensor 52a is an example of a "current value detector".

The distribution controller 53 controls the operation of each of the first switch 51a, the second switch 51b, and the third switch 51c based on a command from the hybrid controller 31. Specifically, the first switch 51a switches between a state in which the BMU 5 and the main battery 33 are connected and a state in which the BMU 5 and the main battery 33 are shut off. The second switch 51b switches between a state in which the BMU 5 and the electric motor battery 34 are connected and a state in which the BMU 5 and the electric motor battery 34 are shut off. The third switch 51c switches between a state in which the BMU 5 and the house battery 35 are connected and a state in which the BMU 5 and the house battery 35 are shut off.

The first current sensor 52a detects the current value I1a of a current that flows from the main battery 33 to the BMU 5 and the current value I1b of a current that flows from the BMU 5 to the main battery 33. The second current sensor 52b detects the current value I2b of the current that flows from the BMU 5 to the electric motor battery 34. The third current sensor 52c detects the current value I3a of a current that flows from the house battery 35 to the BMU 5 and the current value I3b of a current that flows from the BMU 5 to the house battery 35.

The distribution controller 53 is configured or programmed to acquire the current values I1a, I1b, I2b, I3a, and I3b and transmit the acquired current values I1a, I1b, I2b, I3a, and I3b to the hybrid controller 31.

In the first preferred embodiment, the BMU 5 outputs power to the main battery 33 in preference to the electric motor battery 34 based on a command from the hybrid controller 31. A specific description is given below.

The hybrid controller 31 performs a control to compare the charge amount C of the electric motor battery 34 with a charge amount threshold Ct. When the charge amount C of the electric motor battery 34 is equal to or greater than the charge amount threshold Ct, the BMU 5 preferentially supplies power to the main battery 33, the house battery 35, and the electric motor battery 34 in this order.

Specifically, the BMU 5 outputs the second output power P2, which is at least a portion of the surplus power amount Ps obtained by subtracting the demand power amount D1 from the total demand power amount D0, to the electric motor battery 34.

The BMU 5 outputs the demand power amount D1 of first output power P1 to the main battery 33, and outputs third output power P3, which is at least a portion of the surplus power amount Ps, to the house battery 35 when the total demand power amount D0 includes the surplus power amount Ps. The BMU 5 outputs a power amount of second output power P2 obtained by subtracting the demand power amount D3 required by the house battery 35 from the surplus power amount Ps to the electric motor battery 34. That is, regarding the power amount D2a of the second output power P2, a relationship of the following formula (5) holds.

$$D2a = D0 - D1 - D3 \quad (5)$$

When the surplus power amount Ps is equal to or greater than the total value of the demand power amount D2 and the demand power amount D3, the BMU 5 outputs the demand power amount D1 or more of first output power P1 to the main battery 33, outputs the demand power amount D2 of second output power P2 to the electric motor battery 34, and outputs the demand power amount D3 of third output power P3 to the house battery 35.

When the surplus power amount Ps is less than the total value of the demand power amount D2 and the demand power amount D3, the BMU 5 outputs the demand power amount D1 of first output power P1 to the main battery 33, outputs the power amount D2a of second output power P2 more limited than the demand power amount D2 to the electric motor battery 34, and outputs the demand power amount D3 of third output power P3 to the house battery 35.

When the surplus power amount Ps is 0 or less (when there is no surplus power amount Ps), the BMU 5 outputs the first output power P1 to the main battery 33, and stops power supply to the electric motor battery 34 and the house battery 35. That is, in such a case, the hybrid controller 31 transmits, to the BMU 5, command signals to turn off the second switch 51b and the third switch 51c.

The BMU 5 preferentially supplies power to the main battery 33, the electric motor battery 34, and the house battery 35 in this order when the charge amount C of the electric motor battery 34 is less than the charge amount threshold Ct.

When the charge amount C of the electric motor battery 34 is less than the charge amount threshold Ct, the hybrid controller 31 (inverter device 41) performs a control to assist the operation of the clutch 26, while limiting or not performing a control to propel the marine vessel 100 by the electric motor 22. That is, in the first preferred embodiment, the hybrid controller 31 (inverter device 41) performs a control to assist the operation of the clutch 26 even when the charge amount C of the electric motor battery 34 is less than the charge amount threshold Ct.

The BMU 5 outputs the second output power P2, which is at least a portion of the surplus power amount Ps obtained by subtracting at least the demand power amount D1 required by the main battery 33 from the total demand power amount D0, to the electric motor battery 34 even when the charge amount C of the electric motor battery 34 is less than the charge amount threshold Ct.

Specifically, when the surplus power amount Ps is equal to or greater than the total value of the demand power amount D2 and the demand power amount D3, the BMU 5 outputs the demand power amount D1 or more of first output power P1 to the main battery 33, outputs the demand power amount D2 of second output power P2 to the electric motor battery 34, and outputs the demand power amount D3 of third output power P3 to the house battery 35.

In the first preferred embodiment, the BMU 5 performs a control to stop power supply to the house battery 35 when the surplus power amount Ps is 0 or more and less than the total value of the demand power amount D3 and the demand power amount D2. In such a case, the entire surplus power amount Ps is supplied to the motor battery 34. The total value of the demand power amount D3 and the demand power amount D2, and the demand power amount D2 are examples of a "surplus power threshold".

When the surplus power amount Ps is 0 or less, the BMU 5 outputs the first output power P1 to the main battery 33 and stops power supply to the electric motor battery 34 and the house battery 35.

Figure 4:
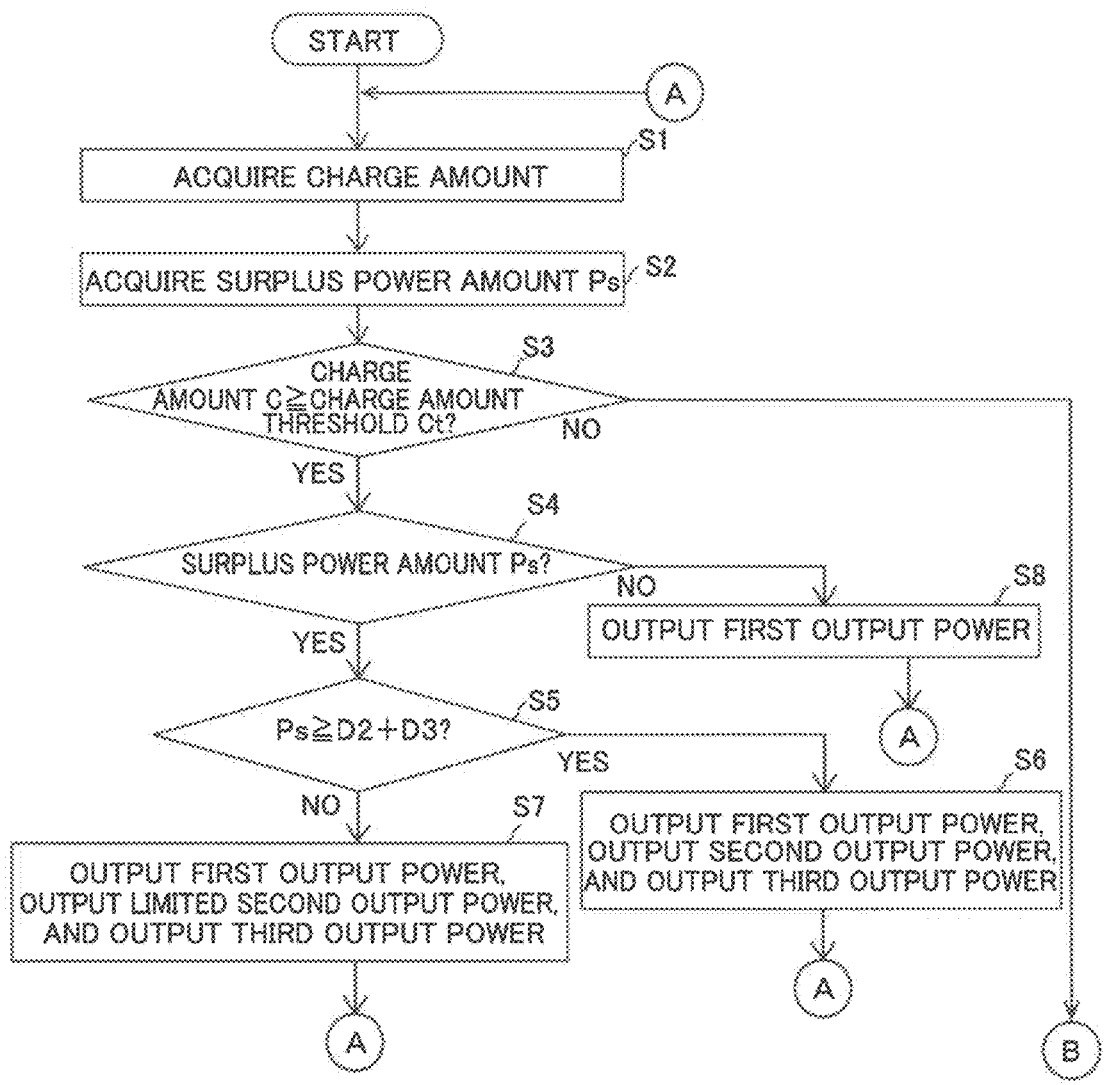
FIG. 4 is a flowchart showing a control process of the marine vessel control system according to the first preferred embodiment of the present invention.
Figure 5:
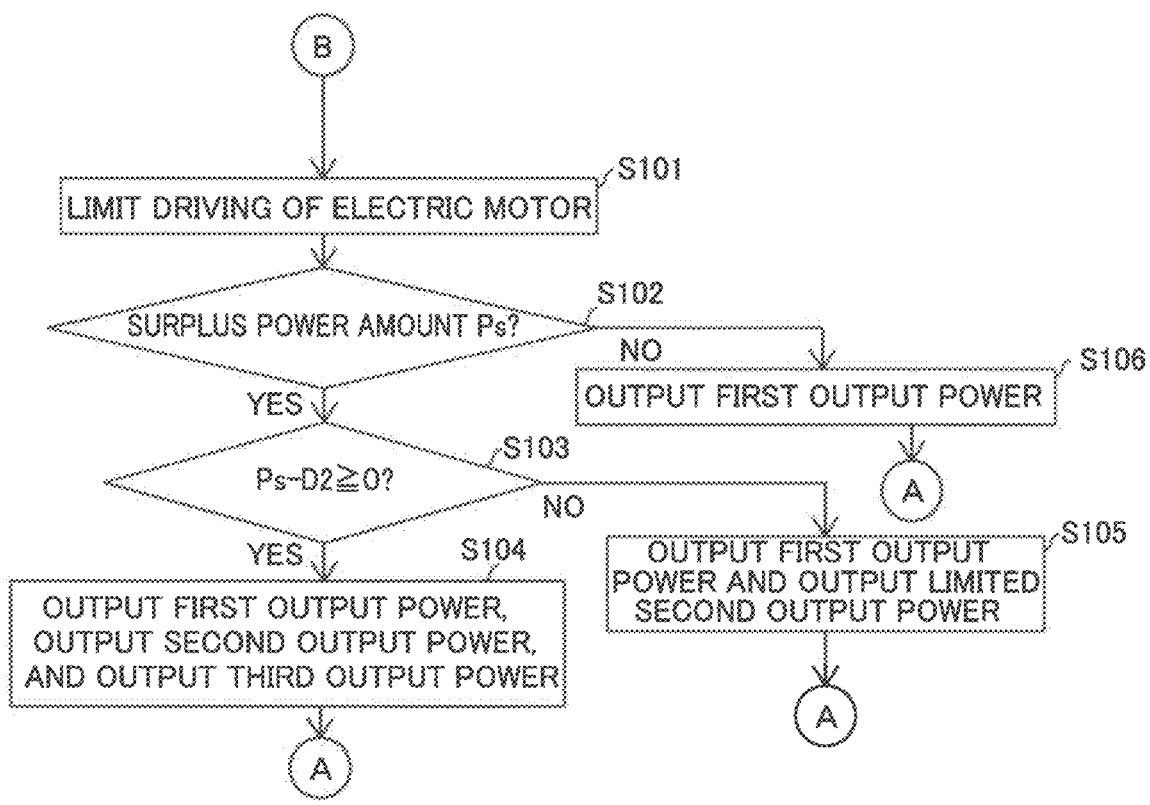
FIG. 5 is a flowchart showing the control process of the marine vessel control system according to the first preferred embodiment of the present invention.

A method for power control in the marine vessel 100 according to the first preferred embodiment is now described with reference to FIGS. 4 and 5. FIGS. 4 and 5 are flowcharts of a power control process of the marine vessel 100. The following control process is performed by the hybrid controller 31 and the distribution controller 53.

As shown in FIG. 4, in step S1, the charge amount C of the electric motor battery 34 is acquired. Then, the process advances to step S2.

In step S2, the surplus power amount Ps is acquired. That is, the total demand power amount D0, the demand power amount D1, the demand power amount D2, and the demand power amount D3 are acquired, and the surplus power amount Ps is calculated. Then, the process advances to step S3.

In step S3, it is determined whether or not the charge amount C is equal to or greater than the charge amount threshold Ct. When the charge amount C is equal to or greater than the charge amount threshold Ct, the process advances to step S4, and when the charge amount C is less than the charge amount threshold Ct, the process advances to step S101 (see FIG. 5).

In step S4, it is determined whether or not there is the surplus power amount Ps. That is, it is determined whether or not the surplus power amount Ps is more than 0. When there is the surplus power amount Ps, the process advances to step S5, and when there is no surplus power amount Ps, the process advances to step S8.

In step S5, it is determined whether or not the surplus power amount Ps is equal to or greater than the total value of the demand power amount D2 and the demand power amount D3. When the surplus power amount Ps is equal to or greater than the total value of the demand power amount D2 and the demand power amount D3, the process advances to step S6, and when the surplus power amount Ps is less than the total value of the demand power amount D2 and the demand power amount D3, the process advances to step S7.

In step S6, the demand power amount D1 of first output power P1 is output to the main battery 33, the demand power amount D2 of second output power P2 is output to the electric motor battery 34, and the demand power amount D3 of third output power P3 is output to the house battery 35. Then, the process returns to step S1.

In step S7, the demand power amount D1 of first output power P1 is output to the main battery 33, the power amount D2a of second output power P2 more limited than the demand power amount D2 is output to the electric motor battery 34, and the demand power amount D3 of third output power P3 is output to the house battery 35. Then, the process returns to step S1.

In step S8, a power amount of first output power P1 equal to the total demand power amount D0 is output to the main battery 33. In such a case, power is not supplied (output) to the electric motor battery 34 or the house battery 35. Then, the process returns to step S1.

As shown in FIG. 5, in step S101 to which the process advances when the charge amount C is less than the charge amount threshold Ct, driving of the electric motor 22 is limited. Specifically, the driving of the electric motor 22, excluding driving to assist the clutch 26, is not performed. Then, the process advances to step S102.

In step S102, it is determined whether or not there is the surplus power amount Ps. When there is the surplus power amount Ps, the process advances to step S103, and when there is no surplus power amount Ps, the process advances to step S106.

In step S103, it is determined whether or not a value obtained by subtracting the demand power amount D2 from the surplus power amount Ps is 0 or more. When the value obtained by subtracting the demand power amount D2 from the surplus power amount Ps is 0 or more, the process advances to step S104, and when the value is less than 0, the process advances to step S105.

In step S104, the demand power amount D1 of first output power P1 is output to the main battery 33, the demand power amount D2 of second output power P2 is output to the electric motor battery 34, and the demand power amount D3 of third output power P3 is output to the house battery 35. Then, the process returns to step S1.

In step S105, the demand power amount D1 of first output power P1 is output to the main battery 33, and a power amount of second output power P2 obtained by subtracting the demand power amount D1 from the total demand power amount D0 is output to the electric motor battery 34. In such a case, power is not supplied to the house battery 35. Then, the process returns to step S1.

In step S106, a power amount of first output power P1 equal to the total demand power amount D0 is output to the main battery 33. In such a case, power is not supplied (output) to the electric motor battery 34 or the house battery 35. That is, in step S104 to step S106, power is preferentially output to the main battery 33, the electric motor battery 34, and the house battery 35 in this order. Then, the process returns to step S1.

In the structure according to the first preferred embodiment described above, the following advantageous effects are achieved.

According to the first preferred embodiment of the present invention, the BMU 5 outputs the demand power amount D1 of first output power P1 to the main battery 33, and outputs at least a portion of the surplus power amount Ps to the electric motor battery 34 when the total demand power amount D0 required by the battery unit 30 includes the surplus power amount Ps. Accordingly, even when the electric motor battery 34 is provided in the marine vessel control system 3, the BMU 5 supplies power to the main battery 33 in preference to the electric motor battery 34. Furthermore, the surplus power amount Ps is supplied to the electric motor battery 34 having a relatively low priority while the demand power amount D1 is supplied to the main battery 33. Consequently, even when power is supplied to the outboard motor 2 including the electric motor 22, a decrease in the amount of power supplied to the main battery 33 is significantly reduced or prevented as much as possible.

According to the first preferred embodiment of the present invention, the BMU 5 outputs, to the electric motor battery 34, at least a portion of the surplus power amount Ps obtained by subtracting at least the demand power amount D1 from the total demand power amount D0. Accordingly, at least a portion of the surplus power amount Ps is supplied to the electric motor battery 34 while the demand power amount D1 is provided within the total demand power amount D0.

According to the first preferred embodiment of the present invention, the battery unit 30 includes the house battery 35 that supplies power to at least one of the devices in the marine vessel 100 excluding the electric motor 22 and the starter motor 25 that starts the engine 21. Furthermore, the BMU 5 outputs the demand power amount D1 of first output power P1 to the main battery 33, and outputs at least a portion of the surplus power amount Ps to the house battery 35 when the total demand power amount D0 includes the surplus power amount Ps. Accordingly, even when the house battery 35 is provided in the marine vessel control system 3, at least a portion of the surplus power amount Ps is supplied to the house battery 35. Consequently, even when the house battery 35 in addition to the main battery 33 and the electric motor battery 34 is provided in the marine vessel control system 3, power is supplied to the main battery 33 in preference to the house battery 35, and thus a decrease in the amount of power supplied to the main battery 33 is significantly reduced or prevented as much as possible.

According to the first preferred embodiment of the present invention, the BMU 5 outputs, to the electric motor battery 34, the power amount D2a of second output power P2 obtained by subtracting the demand power amount D3 from the surplus power amount Ps. Accordingly, at least a portion of the surplus power amount Ps is supplied to the electric motor battery 34 while the demand power amount D3 is provided within the surplus power amount Ps. Consequently, the surplus power amount Ps equal to the demand power amount D3 is supplied to the house battery 35 in preference to the electric motor battery 34.

According to the first preferred embodiment of the present invention, the battery unit 30 includes the house battery 35 that supplies power to at least one of the devices in the marine vessel 100 excluding the electric motor 22 and the starter motor 25 that starts the engine 21. Furthermore, the BMU 5 performs a control to limit power supply to the house battery 35 when the surplus power amount Ps is less than the total value of the demand power amount D3 and the demand power amount D2, and performs a control to stop power supply to the house battery 35 when the surplus power amount Ps is smaller than the demand power amount D2. Accordingly, when the surplus power amount Ps is relatively small, the proportion of the amount of power supplied to the house battery 35 in the total demand power amount D0 is reduced.

According to the first preferred embodiment of the present invention, the marine vessel 100 includes the inverter device 41 to limit driving of the electric motor 22 based on the charge amount C of the electric motor battery 34. Accordingly, when the charge amount C of the electric motor battery 34 is not sufficient, driving of the electric motor 22 is limited such that power consumption of the electric motor battery 34 is reduced. Therefore, a decrease in the charge amount C of the electric motor battery 34 is significantly reduced or prevented, and thus the proportion of the demand power amount D2 required by the electric motor battery 34 in the total demand power amount D0 is reduced. In addition, a decrease in the proportion of the amount of power supplied to the main battery 33 in the total demand power amount D0 is further significantly reduced or prevented.

According to the first preferred embodiment of the present invention, the battery unit 30 includes the house battery 35 to supply power to at least one of the devices in the marine vessel 100 excluding the electric motor 22 and the starter motor 25 that starts the engine 21. Furthermore, the BMU 5 performs a control to limit power supply to the house battery 35 or to stop power supply to the house battery 35 when the charge amount C of the electric motor battery 34 is equal to or less than the charge amount threshold Ct. Accordingly, when the charge amount C of the electric motor battery 34 is equal to or less than the charge amount threshold Ct, the amount of third output power P3 supplied to the house battery 35 is limited or reduced to zero such that the proportion of the amount of power supplied to the electric motor battery 34 in the surplus power amount Ps is increased.

According to the first preferred embodiment of the present invention, the outboard motor 2 includes the clutch 26 provided between the engine 21 and the propeller 23 to switch between a state in which a rotational force is transmitted from the engine 21 to the propeller 23 and a state in which a rotational force is not transmitted from the engine 21 to the propeller 23. Furthermore, the inverter device 41 controls the electric motor 22 to assist driving of the clutch 26 when the clutch 26 performs the switching operation even when the charge amount C of the electric motor battery 34 is equal to or less than the charge amount threshold Ct. Accordingly, driving of the clutch 26 is assisted by the electric motor 22 such that noise generated when the clutch 26 is switched is reduced. In the first preferred embodiment, with the structure described above, even when the charge amount C of the electric motor battery 34 is equal to or less than the charge amount threshold Ct, the electric motor 22 continuously assists driving of the clutch 26. Consequently, even when the charge amount C of the electric motor battery 34 is equal to or less than the charge amount threshold Ct, noise generated when the clutch 26 is switched is reduced.

According to the first preferred embodiment of the present invention, the inverter device 41 includes the current sensor 41a to acquire the charge amount C of the electric motor battery 34 based on the current value I2a of the current that flows from the electric motor battery 34 to the inverter device 41 and the current value I2b of the current that flows from the BMU 5 to the electric motor battery 34. Accordingly, the current value I2a and the current value I2b are detected such that the charge amount C of the electric motor battery 34 is easily acquired by the current sensor 41a (inverter device 41).

According to the first preferred embodiment of the present invention, the BMU 5 includes the first current sensor 52a to detect the current values I1a and I1b of the currents that flow between the BMU 5 and the main battery 33. Furthermore, the hybrid controller 31 is configured or programmed to acquire the demand power amount D1 based on the current values I1a and I1b. Accordingly, the first current sensor 52a is provided such that the demand power amount D1 is easily acquired by the hybrid controller 31.

According to the first preferred embodiment of the present invention, the hybrid controller 31 is configured or programmed to acquire the amount obtained by subtracting the amount of power in the main battery 33 being consumed based on the current value I1a from the amount of power being stored in the main battery 33 based on the current value I1b as the demand power amount D1. Accordingly, the current values I1a and I1b are detected such that the demand power amount D1 is easily acquired by the hybrid controller 31.

According to the first preferred embodiment of the present invention, the marine vessel control system 3 includes the converter 36 to boost the voltage of the second output power P2, which is at least a portion of the surplus power amount Ps, and output the boosted power to the electric motor battery 34. Accordingly, even when the voltage value of power input to the BMU 5 (the voltage value of the surplus power amount Ps) is smaller than a voltage value input to the electric motor battery 34, the power voltage of at least a portion of the surplus power amount Ps is boosted, and thus power is easily supplied to the electric motor battery 34. The converter 36 adjusts the magnitude of the power when the voltage is boosted, and thus the power amount of first output power P1 to be output to the main battery 33 and the power amount of second output power P2 to be output to the electric motor battery 34 are easily distributed using the converter 36.

According to the first preferred embodiment of the present invention, the marine vessel 100 includes the generator 42 to generate power and input the generated power to the BMU 5. Accordingly, power to be supplied to the BMU 5 is generated by the generator 42.

According to the first preferred embodiment of the present invention, the BMU 5 outputs the demand power amount D1 of power required by the main battery 33 to the main battery 33, and outputs at least a portion of the surplus power amount Ps to the electric motor battery 34 when the total demand power amount D0 obtained by subtracting the output power amount output from the battery unit 30 from the input power amount input to the battery unit 30 includes the surplus power amount Ps. Accordingly, the total demand power amount D0 is easily acquired, and power is supplied to the main battery 33 in preference to the electric motor battery 34 based on the acquired total demand power amount D0.

In the control method according to the first preferred embodiment described above, the following advantageous effects are achieved.

According to the first preferred embodiment of the present invention, a decrease in the amount of power supplied to the main battery 33 is significantly reduced or prevented as much as possible even when power is supplied to the outboard motor 2 including the electric motor 22, similarly to the structure according to the first preferred embodiment of the present invention.

Second Preferred Embodiment

The structure of a marine vessel 200 according to a second preferred embodiment of the present invention is now described with reference to FIG. 6. In the second preferred embodiment, power is input from an electric motor battery unit 234 to a BMU 205 when there is no surplus power amount Ps, unlike the marine vessel 100 according to the first preferred embodiment in which the second switch 51b is turned off when there is no surplus power amount Ps.

Figure 6:
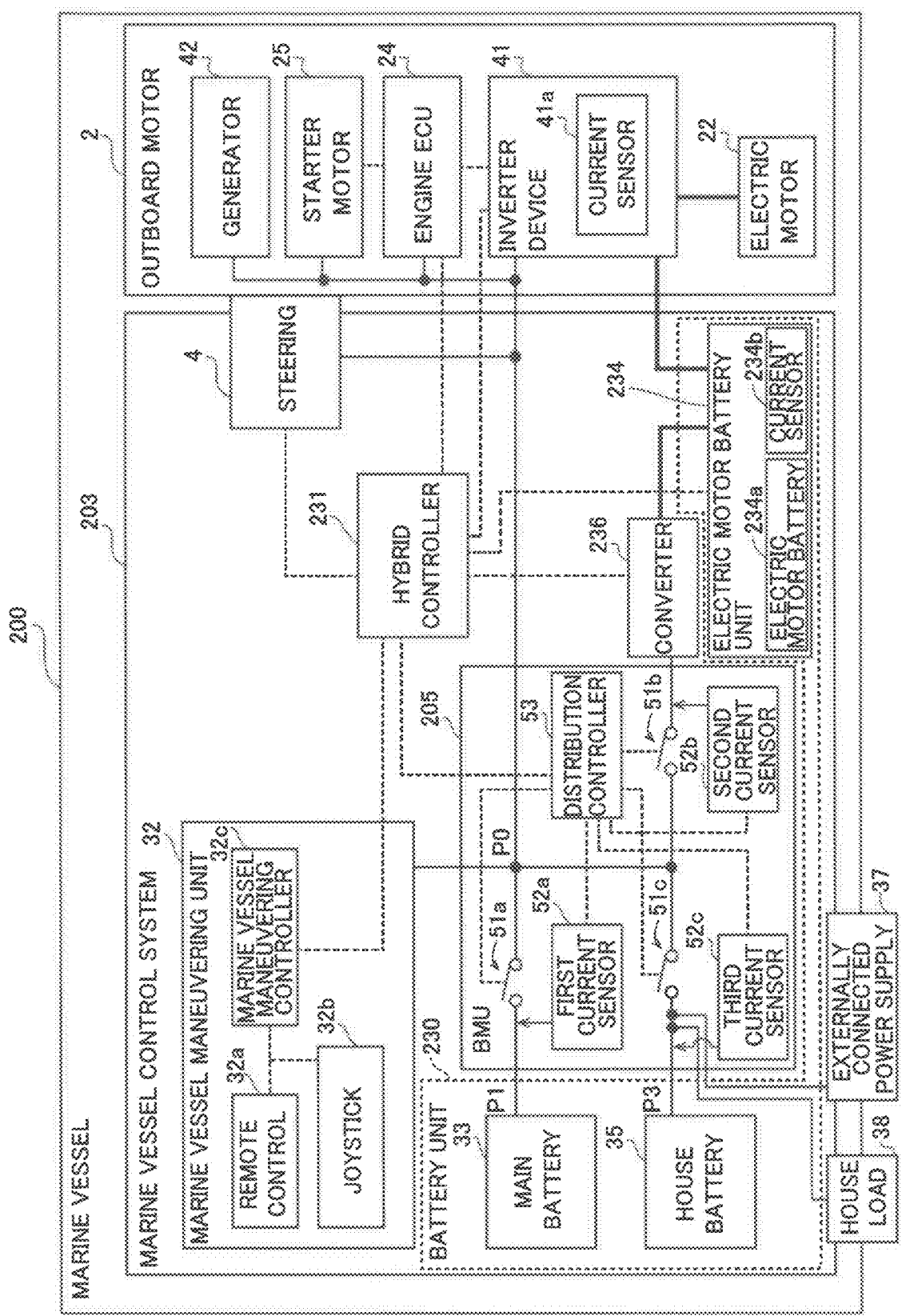
FIG. 6 is a block diagram showing the structure of a marine vessel according to a second preferred embodiment of the present invention.

As shown in FIG. 6, the marine vessel 200 according to the second preferred embodiment includes a marine vessel control system 203. The marine vessel control system 203 includes the BMU 205, a battery unit 230, a hybrid controller 231, and a converter 236. The battery unit 230 includes the electric motor battery unit 234. The marine vessel control system 203 is an example of a "marine power supply system". The BMU 205 and the hybrid controller 231 are examples of a "power distributor".

The electric motor battery unit 234 includes an electric motor battery 234a and a current sensor 234b. The electric motor battery 234a is a lithium-ion battery, for example. The current sensor 234b detects a current value I2c of a current that flows from the converter 236 to the electric motor battery unit 234 and a current value I2d of a current that flows from the electric motor battery unit 234 to the inverter device 41. The current sensor 234b transmits information on the detected current values I2c and I2d to the hybrid controller 231. The hybrid controller 231 is configured or programmed to acquire the charge amount Ca of the electric motor battery 234a based on the current values I2c and I2d. The electric motor battery 234a is an example of a "second battery".

The hybrid controller 231 is configured or programmed to input power from the electric motor battery unit 234 to the BMU 205 when there is no surplus power amount Ps. Specifically, the hybrid controller 231 controls the converter 236 to lower the voltage of the power from the electric motor battery unit 234 and input the power having the lowered voltage to the BMU 205 when there is no surplus power amount Ps. Thus, power is input from the electric motor battery unit 234 to the main battery 33 via the BMU 205. The remaining structures of the second preferred embodiment are similar to those of the first preferred embodiment.

In the structure according to the second preferred embodiment described above, the following advantageous effects are achieved.

According to the second preferred embodiment of the present invention, the hybrid controller 231 and the BMU 205 are configured or programmed to input power from the electric motor battery 234a to the BMU 205 when there is no surplus power amount Ps. Accordingly, even when there is no surplus power amount Ps, power is supplied from the electric motor battery 234a to the main battery 33. Consequently, a decrease in the amount of power supplied to the main battery 33 is further significantly reduced or prevented. The remaining advantageous effects of the second preferred embodiment are similar to those of the first preferred embodiment.

Third Preferred Embodiment

The structure of a marine vessel 300 according to a third preferred embodiment of the present invention is now described with reference to FIG. 7. In the third preferred embodiment, driving of an electric motor 22 is limited based on a surplus power amount Ps being smaller than a demand power amount D2.

Figure 7:
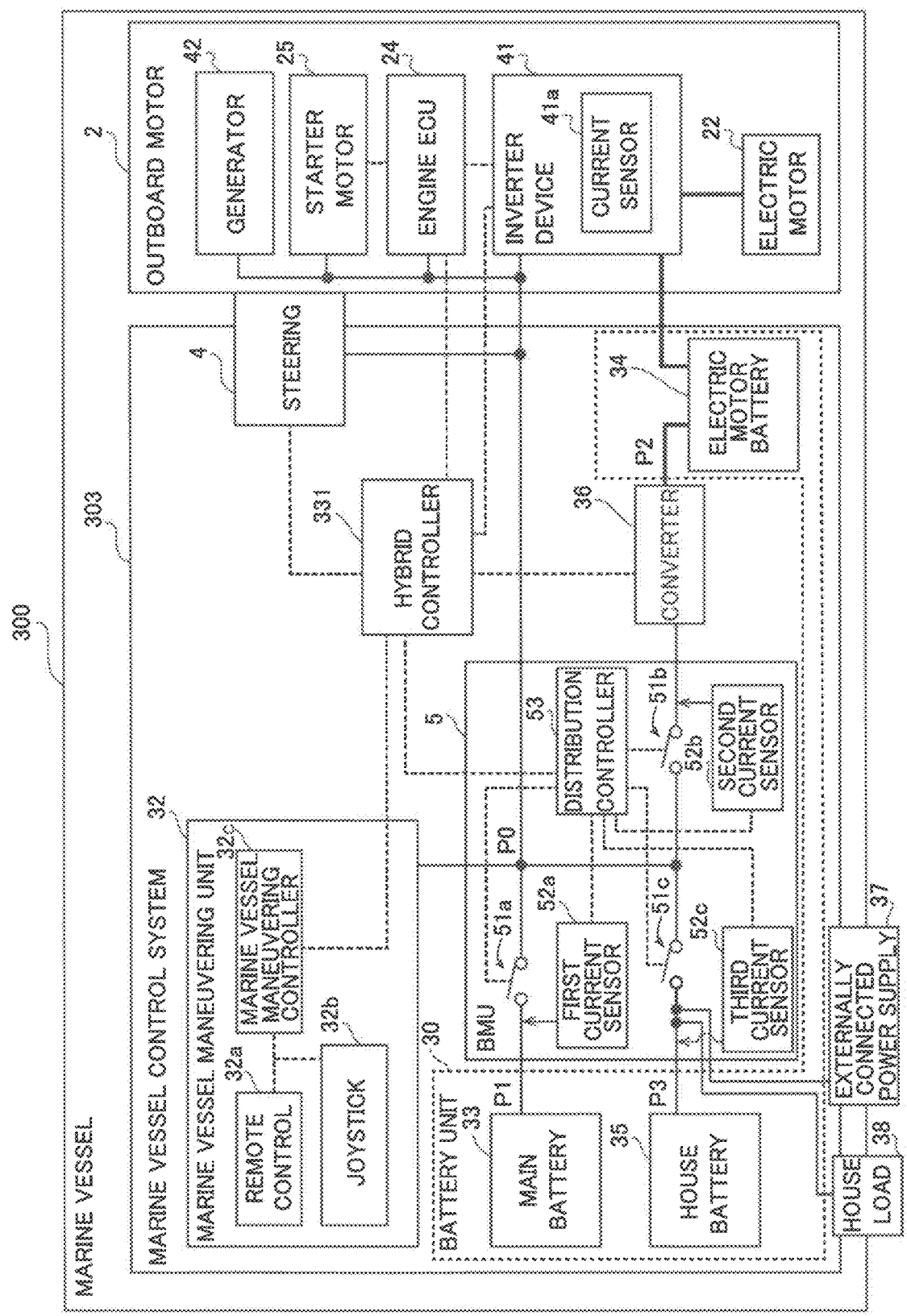
FIG. 7 is a block diagram showing the structure of a marine vessel according to a third preferred embodiment of the present invention.

As shown in FIG. 7, the marine vessel 300 according to the third preferred embodiment includes a marine vessel control system 303. The marine vessel control system 303 includes a hybrid controller 331. The marine vessel control system 303 is an example of a "marine power supply system". The hybrid controller 331 is an example of a "power distributor".

The hybrid controller 331 is configured programmed to limit driving of the electric motor 22 when a surplus power amount Ps is smaller than a demand power amount D2 even when the charge amount C is equal to or greater than a charge amount threshold Ct. Specifically, the hybrid controller 331 performs a control to not perform driving of the electric motor 22 excluding driving to assist a clutch 26. The remaining structures of the third preferred embodiment are similar to those of the first preferred embodiment.

In the structure according to the third preferred embodiment described above, the following advantageous effects are achieved.

According to the third preferred embodiment of the present invention, the hybrid controller 331 is configured or programmed to limit driving of the electric motor 22 when the surplus power amount Ps is smaller than the demand power amount D2. Accordingly, the power consumption of an electric motor battery 34 is reduced, and thus a decrease in the charge amount C of the electric motor battery 34 is significantly reduced or prevented even when power is supplied to a main battery 33 in preference to the electric motor battery 34. The remaining advantageous effects of the third preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the marine vessel is preferably an outboard motor boat in each of the first to third preferred embodiments described above, the present invention is not restricted to this. That is, the marine vessel may alternatively be a marine vessel other than an outboard motor boat. For example, the marine vessel may be a marine vessel including an inboard motor, an inboard-outboard motor, or a jet propulsion device.

While the main battery, the electric motor battery, and the house battery are preferably provided in the hull in each of the first to third preferred embodiments described above, the present invention is not restricted to this. That is, at least one of the main battery, the electric motor battery, or the house battery may alternatively be provided in the outboard motor.

While the demand power amount D1 of a first output power is preferably output from the BMU to the main battery in each of the first to third preferred embodiments described above, the present invention is not restricted to this. That is, a power amount of a first output power larger than the demand power amount D1 may alternatively be output from the BMU to the main battery.

While power is preferably supplied from the electric motor battery only to the electric motor via the inverter device in each of the first to third preferred embodiments described above, the present invention is not restricted to this. That is, power may alternatively be supplied from the electric motor battery to a device other than the electric motor.

While power is preferably supplied from the BMU to the house battery in each of the first to third preferred embodiments described above, the present invention is not restricted to this. That is, power may alternatively be output from the BMU only to the main battery and the electric motor battery.

While the amount of power supplied is preferably prioritized based on the charge amount of the electric motor battery in each of the first to third preferred embodiments described above, the present invention is not restricted to this. That is, the priority of the amount of power supplied may alternatively be fixed.

While power supply to the house battery is preferably stopped by turning off the third switch in each of the first to third preferred embodiments described above, the present invention is not restricted to this. For example, the BMU may alternatively include a current adjuster such as a converter instead of the third switch to adjust (limit) the amount of power supplied to the house battery.

While the electric motor battery is preferably a lead storage battery in each of the first and third preferred embodiments described above, and the electric motor battery is preferably a lithium-ion battery in the second preferred embodiment described above, the present invention is not restricted to this. That is, in the structures of the first and third preferred embodiments, the electric motor battery may alternatively be a lithium-ion battery, for example, and in the structure of the second preferred embodiment, the electric motor battery may alternatively be a lead storage battery, for example.

While as examples of the surplus power threshold, the total value of the demand power amount D3 and the demand power amount D2, the demand power amount D2, and the demand power amount D3 are preferably defined in each of the first to third preferred embodiments described above, the present invention is not restricted to this. That is, the surplus power threshold may alternatively be a value other than the total value, the demand power amount D2, and the demand power amount D3 described above.

While a control to assist the operation of the clutch is preferably performed even when the charge amount of the electric motor battery is equal to or less than the charge amount threshold in each of the first to third preferred embodiments described above, the present invention is not restricted to this. For example, a control to assist the operation of the clutch may alternatively be stopped when the charge amount of the electric motor battery is equal to or less than the charge amount threshold.

While the generator is preferably provided in the outboard motor in each of the first to third preferred embodiments described above, the present invention is not restricted to this. For example, the generator may alternatively be provided in the hull.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine power supply system for supplying power to a marine propulsion unit including a propulsion generator, an engine that drives the propulsion generator, and an electric motor that drives the propulsion generator, the marine power supply system comprising:
    a battery unit including a first battery to supply power to a starter to start the engine, and a second battery to supply power to the electric motor; and
    a power distributor connected to the first battery and the second battery; wherein
    the power distributor outputs a demand power amount of power required by the first battery to the first battery, and outputs at least a portion of surplus power to the second battery when a total demand power amount required by the battery unit includes the surplus power.

2. The marine power supply system according to claim 1, wherein at least a portion of the surplus power is obtained by subtracting at least the demand power amount required by the first battery from the total demand power amount.

3. The marine power supply system according to claim 1, wherein
    the battery unit further includes a third battery to supply power to at least one of a plurality of devices in a marine vessel excluding the electric motor and the starter; and
    the power distributor outputs the demand power amount of the power required by the first battery to the first battery, and outputs at least a portion of the surplus power to the third battery when the total demand power amount includes the surplus power.

4. The marine power supply system according to claim 3, wherein the power distributor outputs to the second battery a power amount of power obtained by subtracting a demand power amount required by the third battery from the surplus power.

5. The marine power supply system according to claim 1, wherein
    the battery unit further includes a third battery to supply power to at least one of a plurality of devices in a marine vessel excluding the electric motor and the starter; and
    the power distributor performs a control to limit a power supply to the third battery or to stop the power supply to the third battery when the surplus power is less than a surplus power threshold.

6. The marine power supply system according to claim 1, further comprising:
    an electric motor controller configured or programmed to limit driving of the electric motor based on a charge amount of the second battery.

7. The marine power supply system according to claim 6, wherein
the battery unit further includes a third battery to supply power to at least one of a plurality of devices in a marine vessel excluding the electric motor and the starter; and
the power distributor performs a control to limit a power supply to the third battery or to stop the power supply to the third battery when the charge amount of the second battery is equal to or less than a charge amount threshold.

8. The marine power supply system according to claim 7, wherein
the marine propulsion unit includes a clutch provided between the engine and the propulsion generator to switch between a state in which a rotational force is transmitted from the engine to the propulsion generator and a state in which a rotational force is not transmitted from the engine to the propulsion generator; and
the electric motor controller is configured or programmed to control the electric motor to assist driving of the clutch when the clutch performs a switching operation even when the charge amount of the second battery is equal to or less than the charge amount threshold.

9. The marine power supply system according to claim 6, further comprising:
a charge amount acquirer to acquire the charge amount of the second battery based on a current value of a current that flows from the power distributor to the second battery and a current value of a current that flows from the second battery to the electric motor controller.

10. The marine power supply system according to claim 1, wherein the power distributor includes a current value detector to detect a current value of a current that flows between the power distributor and the first battery, and acquires the demand power amount required by the first battery based on the current value.

11. The marine power supply system according to claim 10, wherein the power distributor acquires, as the demand power amount required by the first battery, an amount obtained by subtracting an amount of power in the first battery being consumed based on a current value of a current that flows from the first battery to the power distributor from an amount of power being stored in the first battery based on a current value of a current that flows from the power distributor to the first battery.

12. The marine power supply system according to claim 1, wherein the power distributor includes a converter to boost a voltage of at least a portion of the surplus power and output boosted power to the second battery.

13. The marine power supply system according to claim 1, wherein the power distributor inputs power from the second battery to the power distributor when there is not the surplus power.

14. The marine power supply system according to claim 1, further comprising:
a generator to generate power and input generated power to the power distributor.

15. The marine power supply system according to claim 1, wherein the power distributor outputs the demand power amount of the power required by the first battery to the first battery, and outputs at least a portion of the surplus power to the second battery when the total demand power amount obtained by subtracting an output power amount output from the battery unit from an input power amount input to the battery unit includes the surplus power.

16. A marine power supply system for supplying power to a marine propulsion unit including a propulsion generator, an engine that drives the propulsion generator, and an electric motor that drives the propulsion generator, the marine power supply system comprising:
a battery unit including a first battery to supply power to a starter to start the engine, and a second battery to supply power to the electric motor; and
a power distributor connected to the first battery and the second battery to output power to the first battery in preference to the second battery.

17. A method for power control in a marine propulsion system including a propulsion generator, an engine that drives the propulsion generator, and an electric motor that drives the propulsion generator, the method comprising:
outputting, to a first battery that supplies power to a starter that starts the engine, a demand power amount of power required by the first battery; and
outputting at least a portion of surplus power to a second battery that supplies power to the electric motor when a total demand power amount required by a battery unit including the first battery and the second battery includes the surplus power.

18. The method for power control according to claim 17, wherein
the outputting of at least the portion of the surplus power to the second battery includes outputting to the second battery at least a portion of the surplus power obtained by subtracting at least the demand power amount required by the first battery from the total demand power amount.

19. The method for power control according to claim 17, wherein
the battery unit further includes a third battery to supply power to at least one of a plurality of devices in a marine vessel excluding the electric motor and the starter; and
the method further comprises outputting at least a portion of the surplus power to the third battery when the total demand power amount includes the surplus power.

20. The method for power control according to claim 19, wherein the outputting of at least the portion of the surplus power to the second battery includes outputting to the second battery a power amount of power obtained by subtracting a demand power amount required by the third battery from the surplus power.

* * * * *